United States Patent
Pingel

(10) Patent No.: US 8,621,919 B2
(45) Date of Patent: Jan. 7, 2014

(54) METHOD AND APPARATUS FOR DETERMINING THE TREAD DEPTH OF A VEHICLE TIRE

(75) Inventor: Ulrich Pingel, Marl (DE)

(73) Assignee: Ventech GmbH, Marl (DE)

( * ) Notice: Subject to any disclaimer, the term of this patent is extended or adjusted under 35 U.S.C. 154(b) by 0 days.

(21) Appl. No.: 13/138,833

(22) PCT Filed: Mar. 11, 2010

(86) PCT No.: PCT/DE2010/000258
§ 371 (c)(1),
(2), (4) Date: Nov. 28, 2011

(87) PCT Pub. No.: WO2010/115390
PCT Pub. Date: Oct. 14, 2010

(65) Prior Publication Data
US 2012/0067115 A1    Mar. 22, 2012

(30) Foreign Application Priority Data
Apr. 8, 2009 (DE) .......................... 10 2009 016 498

(51) Int. Cl.
*G01M 17/02* (2006.01)

(52) U.S. Cl.
USPC .......................................................... 73/146

(58) Field of Classification Search
None
See application file for complete search history.

(56) References Cited

U.S. PATENT DOCUMENTS

| | | | |
|---|---|---|---|
| 5,789,668 A * | 8/1998 | Coe et al. ......................... | 73/146 |
| 5,987,978 A * | 11/1999 | Whitehead ....................... | 73/146 |
| 6,069,966 A | 5/2000 | Jones et al. | |
| 7,269,997 B2 * | 9/2007 | Dale et al. ........................ | 73/146 |
| 7,602,506 B2 | 10/2009 | Hoffmann et al. | |
| 8,079,254 B2 * | 12/2011 | Braghiroli et al. ............... | 73/146 |
| 2009/0000370 A1* | 1/2009 | Lionetti et al. ................... | 73/146 |
| 2009/0071236 A1* | 3/2009 | Kouyama ......................... | 73/146 |

FOREIGN PATENT DOCUMENTS

| | | |
|---|---|---|
| DE | 1 809 459 A1 | 6/1970 |
| DE | 43 16 984 A1 | 8/1994 |
| DE | 103 13 191 A1 | 10/2004 |
| DE | 102 39 765 B4 | 3/2005 |
| EP | 0 469 948 A1 | 2/1992 |
| EP | 0 816 799 A2 | 1/1998 |
| EP | 0 869 330 A2 | 10/1998 |
| WO | WO 98/34090 A1 | 8/1998 |

* cited by examiner

*Primary Examiner* — Andre Allen
(74) *Attorney, Agent, or Firm* — Marshall & Melhorn, LLC

(57) ABSTRACT

A method for determining the tread depth of a vehicle tire, with the tire being mounted on a vehicle, the tire being rolled over or placed on a measuring station, the tread of the tire being optically sensed transversely to the rolling direction of the tire on at least one measuring line, a ray fan extending from a light source being reflected at the tire surface and a signal of the reflected ray fan being recorded by a sensor, and the signal of the reflected ray fan being evaluated by way of a triangulation method, is characterized in that the signal is recorded in a non-orthogonal manner to the tire surface.

11 Claims, 1 Drawing Sheet

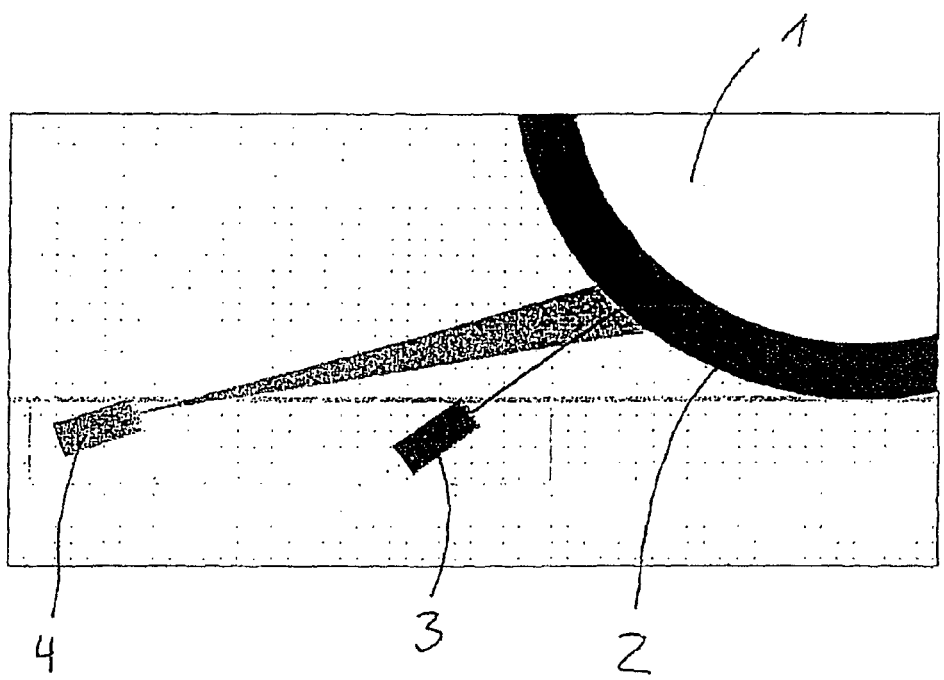

METHOD AND APPARATUS FOR DETERMINING THE TREAD DEPTH OF A VEHICLE TIRE

BACKGROUND OF THE INVENTION

The invention relates to a method for determining the tread depth of a vehicle tire, with the tire being mounted on a vehicle, the tire being rolled over or placed on a measuring station, the tread of the tire being optically sensed transversely to the rolling direction of the tire on at least one measuring line, a ray fan extending from a light source being reflected at the tire surface and a signal of the reflected ray fan being recorded by a sensor, and the signal being evaluated. The invention further relates to an apparatus for determining the tread depth of a vehicle tire, comprising a measuring station which includes a light source and an image-resolving sensor, as well as comprising an evaluation unit for signals of a ray fan reflected at the tire surface.

The method as described enables a measurement of the tire tread depth while a vehicle is running over a stationary sensor station. Thereby, the entire cross profile of the tire is detected, but only a portion of the circumference of the tire.

Currently usual methods for measuring the tread depth while passing over a station are based on that the tread depth is measured exactly when the tire is placed with its foot print horizontally over the sensor. This has the advantage that the tire tread stands statically over the contact surface during a short time interval and can be determined using contacting methods or can be sampled using contactless methods, such as ultrasonics, radar reflectivity or other optical methods, for example lasertriangulation or light section processes.

The light section measuring technique is in particular advantageous for a quick three dimension detection of objects. Thereby, a laser using a specific expansion optics projects a light line onto the surface of the tire. Systems working with light section measuring technique are utilized in all stages of tire production until inspection of the finished product. The invention, however does not mean such an inspection of the tire during its fabrication. Moreover, the invention seeks to perform a tire inspection at a tire mounted on a vehicle, for example in flowing traffic without the traffic flow itself being influenced.

DE 43 16 984 A1 describes a method and a device for automatically determining the tread depth of vehicle tires mounted on the vehicle. In the flow of a measuring station a partly transparent measuring plate is arranged, with a measuring head being placed therebelow. This measuring head comprises a laser and an image-resolving sensor as a triangulation unit. For measuring the tread depth of a vehicle tire, the measuring plate is rolled over by the tire or the tire is placed on the measuring plate. Then, the laser creates a light spot on the tread surface of the tire. The position of the light spot is monitored by the sensor. The output signals of the sensor are passed to an evaluation unit which determines the dimensions of the tire tread. The measuring head is arranged at a carriage and can be moved transverse to the rolling direction of the tire. To avoid a faulty measuring result, the laser is oriented such that the laser beam impinges onto the tire tread outside the foot print of the tire. Within the foot print, the tire is considerably loaded by tire load and the tire pressure, so that the knobs of the tire profile are compressed in radial direction of the tire so that the relevant profiled contour is possibly not recognizable at all and the tread depth is evaluated too small. The measuring result does no longer correspond to the manual measurement which is seen a reference. Since this effect at least depends on the material properties of the rubber, on the tire tread, on the tread depth, on the tire pressure and on the tire load, it cannot be determined or compensated. Outside the foot print, on the other hand, measuring is done practically without any load.

However, point measurements, as performed according to DE 43 16 984 A1, have the disadvantage that there is no relationship to the outer contour of the tire. If the sensor measures within a tread groove, it has no information about the height of the reference surface and, therefore, cannot achieve at precise results. This, in turn, can only be avoided by contact of the tire which however involves the disadvantages previously described.

In this method, moreover, it is measured only along a line of the tire tread transverse to the rolling direction of the tire. Thereby, only chance will decide whether the tread depth at this position of the tire is representative for the tread depth of the entire tire. It is also not possible to select a specific position of the tire tread surface to perform the measurement, since it is completely random which part of the tread surface is currently located over the measuring head. DE 43 16 984 A1 attempts to address this problem by providing several measuring units consecutively arranged in direction of motion.

WO 98/34090 solves a part of the problems addressed above in that the profile surface of the vehicle tire is charged by a linear laser beam. The light reflected back from the tread surface of the tire is detected by an image-resolving sensor, which signals are processed for producing output data in accordance with the tread depth. Thereby the vehicle tire which engages at least one rotatable roller is rotated during the measurement so that measuring can take place at several positions of the tire tread. Furthermore, forces shall become effective by rotating the tire, so that contamination and loose stones are removed from the tread surface. Since this method is to be used in a garage, for example during braking tests, the system cannot necessarily be used in a traffic situation wherein, depending on weather conditions, permanently contamination and also moisture can dominate which interfere a measurement, since for example wet tires produce large inaccuracies caused by reflections.

DE 103 13 191 A1 describes a method of contactless dynamical detection of the profile of a solid body, in particular a vehicle tire. Determination of the profile occurs by means of triangulation wherein correction values determined from the moving velocity of the vehicle tire are considered.

DE 18 09 459 A1 discloses a method and an arrangement for measuring the tread depth of vehicle tires the loaded tread is measured. According to EP 0 869 330 A2, the tire is rotated through rollers during measuring the tire profile by means of triangulation. The latter is also disclosed in WO 98/34090, wherein the sensor receiving the reflected signal is oriented orthogonally to the tire surface. Also EP 0 816 799 A2 describes a method wherein the tire is rotated by rollers. Determination of tread depth occurs also by means of triangulation.

SUMMARY OF THE INVENTION

It is therefore the object of the invention to provide a method and an apparatus for determining the tread depth of a vehicle tire wherein the quality of the measuring results is not materially impaired by contaminated surroundings or by moisture.

This object is solved by a method according to claim 1 and by an apparatus according to claim 8 preferred embodiments are subject of respectively referenced subclaims.

According to the invention it is provided that the signal is recorded in a non-orthogonal manner to the tire surface, i. a. neither light source nor sensor are at a direct reflection angle during measuring. Thereby, reflections of wet tires do not result in measurement errors or failure. To achieve at a precise measuring result, however, a surface angle of the tire at the measuring site must be determined or must be known and involved in the calculation. This can be achieved by simultaneous detection at two vertically offset positions and/or by several measurements in different distance to the tire. As an alternative, a known diameter of the tire may deliver the desired information.

Preferably, the ray fans are arranged to that they overlap on the tire to form a continuous horizontal line, either at the same height to obtain a continuous line configuration, or at different heights, to obtain several lines in different height positions.

Thereby, a compensation of measuring influences is achieved by the angle of the light source and by the viewing direction of the sensor.

Measuring is preferably achieved at several sites of the tire during a measurement recording, so simultaneously by several light lines or by several sequential recordings at respectively different positions of the tire. Hereby, measurements on wear marks may be recognized and considered. By comparison of several tread depth measurements along the circumference of the tire, recognition of signs of longitudinal wear at the tire is possible.

The technique for measuring the tread depth previously described is laser triangulation, either as point measurement or in a light section process. Apart from the endangerment by intense laser radiation, disadvantages show up due to speckle noise, high sensitivity against contamination and high costs.

Thereby, the laser has the big advantage of sharp imaging in great distance, whereby an optical triangulation assembly can be constructed simply and in a highly precise fashion.

For measuring tire tread depths, it is measured at a target having matt black surfaces which require a high laser power representing a strong endangerment for a subject. Furthermore, without sophisticated procedure, local interferences occur on diffusely reflecting surfaces which considerably impair measuring accuracy.

These problems are addressed by, further according to the invention, illuminating with at least one light emitting diode.

For a triangulation assembly in a vertical direction, it is requisite that one or several sharply imaged horizontal lines are projected onto the tire as light lines or light bars. If now a line or a light bar edge is viewed from another vertical angle for example with a camera, depth variations of the tire become visible, similar to the laser light section process. For a wider light bar, the upper and lower edge maybe evaluated separately, so that independent measuring results are obtained. Thus, for example, the surface angle of the tire can be determined.

The light bars of light lines to be projected onto the tire may be obtained by line shaped shadowing of a spot light source, such as for example a light emitting diode. Shadowing may be considerably improved by focussing the light source. The light is then shadowed by a slit and forms a bright and sharply bound light bar on the tire.

Light emitting diodes have the advantage that they produce mostly monochromatic light. So extraneous light may be effectively minimized by means of a narrow band colour filter.

BRIEF DESCRIPTION OF THE DRAWINGS

The invention will be explained below with the aid of the drawing. It shows a schematic sketch of an apparatus for determining the tread depth of a vehicle tire according to an embodiment of the invention.

DETAILED DESCRIPTION OF THE INVENTION

Tire 1 mounted on a vehicle is measured in front of or behind the foot print.

Thereby, a ray fan is produced by means of a laser or a shadowed light emitting diode as light source 3 which impinges transversely to the moving direction of tire 1. Measurement is performed in a non-orthogonal manner to a surface 2 of tire 1, so that neither lights source 3 nor a sensor 4 is at the direct reflection angle. Sensor 4 thereby is a two dimensionally resolving camera.

With this measuring process a very flat construction is possible, which allows a module which can be rolled over or a module which is simply sunk into the ground.

Evaluation occurs by generating an envelope of the measured tire tread and by looking for the deepest parts of the tread grooves. Tire edges are determined, as well as main tread grooves in the cross profile which then allows a narrowing to a range to be evaluated, for example to 75% of the tire width according to the Regulations Authorizing the Use of the Vehicles for Road Traffic StVZo. The angle between tire surface and measuring system is compensated. Eventually, a critical profile depth is calculated using the difference between envelope and deepest position of tread grooves.

By the invention, compensation of measuring influences by the angle of the light source and during direction of the sensor is successful. Thereby, tire position, tire width and relevant tread area may be determined on the basis of the tire sides.

The features disclosed in the foregoing description, in the claims and/or in the accompanying drawings may, both separately and in any combination thereof, be material for realising the invention in diverse forms thereof.

The invention claimed is:

1. A method for determining the tread depth of a vehicle tire, with the tire being mounted on a vehicle, comprising the steps wherein:
   while the tire is rolling over a stationary measuring station in a rolling direction, the tread of the tire is optically sensed transversely to the rolling direction of the tire on at least one measuring line, wherein a ray fan extending from a light source being reflected at the tire surface and a signal of the reflected ray fan is recorded by a sensor in a non-orthogonal manner to the tire surface, and wherein measuring is carried out outside a foot print of the tire on the measuring station; and
   the signal of the reflected ray fan is evaluated by way of a triangulation method;
   wherein a surface angle of the tire is determined as an angle between a normal to the tire surface and the direction towards the light source or the direction towards the sensor.

2. The method of claim 1, wherein the surface angle of the tire is determined by
   detecting at two vertically offset positions on the tire surface; or
   by performing several measurements on the tire surface in different distances to the tire; or
   using the diameter of the tire for calculation.

3. The method of claim 1, wherein the ray fan is produced in a light section process.

4. The method of claim 1, wherein the ray fan is produced in a light section process using a laser.

5. The method of claim 1, wherein the ray fan is produced by a line shaped shadowing of at least one spot light source.

6. The method of claim 5, wherein signals of both edges of the line shaped shadowing are evaluated to determine the surface angle of the tire.

7. An apparatus for determining the tread depth of a vehicle tire, with the tire mounted on a vehicle, comprising
    a measuring station including a light source and a sensor, wherein the light source produces a ray fan extending along at least one measuring line transversely to the rolling direction of the tire and outside a foot print of the tire wherein the sensor records signals of the ray fan reflected from the tire surface in a non-orthogonal manner with respect to the tire surface; and
    an evaluation unit for the signals of the ray fan reflected from the tire surface which runs through a triangulation method;
    wherein the measuring station is further configured to determine a surface angle of the tire as an angle between a normal to the tire surface and the direction towards the light source or the direction towards the sensor by detecting at two vertically offset positions on the tire surface or by performing several measurements on the tire surface in different distances to the tire.

8. The apparatus of claim 7, wherein the light source is comprised of a laser or at least one light emitting diode.

9. The apparatus of claim 7, wherein the sensor is a two dimensionally resolving camera.

10. The apparatus of claim 7, wherein the light source is a light emitting diode and ambient light is eliminated by spectral filters.

11. The method of claim 1, wherein the surface angle of the tire is determined by
    detecting at two vertically offset positions on the tire surface; or
    by performing several measurements on the tire surface in different distances to the tire.

\* \* \* \* \*

UNITED STATES PATENT AND TRADEMARK OFFICE
CERTIFICATE OF CORRECTION

PATENT NO.       : 8,621,919 B2
APPLICATION NO. : 13/138833
DATED            : January 7, 2014
INVENTOR(S)      : Ulrich Pingel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 11 days.

Signed and Sealed this
Twenty-second Day of September, 2015

Michelle K. Lee
*Director of the United States Patent and Trademark Office*